(12) United States Patent
Wilkinson

(10) Patent No.: US 10,275,324 B2
(45) Date of Patent: Apr. 30, 2019

(54) REPLICATION WITH MULTIPLE CONSISTENCY GROUPS PER VOLUME

(71) Applicant: International Business Machines Corporation, Armonk, NY (US)

(72) Inventor: John P. Wilkinson, Salisbury (GB)

(73) Assignee: International Business Machines Corporation, Armonk, NY (US)

( * ) Notice: Subject to any disclaimer, the term of this patent is extended or adjusted under 35 U.S.C. 154(b) by 101 days.

(21) Appl. No.: 15/643,864

(22) Filed: Jul. 7, 2017

(65) Prior Publication Data

US 2019/0012239 A1    Jan. 10, 2019

(51) Int. Cl.
*G06F 11/00* (2006.01)
*G06F 11/14* (2006.01)

(52) U.S. Cl.
CPC ...... *G06F 11/1469* (2013.01); *G06F 11/1451* (2013.01); *G06F 2201/805* (2013.01); *G06F 2201/82* (2013.01)

(58) Field of Classification Search
CPC .................................................. G06F 11/469
USPC ................................................. 714/6.12, 19
See application file for complete search history.

(56) References Cited

U.S. PATENT DOCUMENTS

| 7,765,187 | B2 | 7/2010 | Bergant et al. | |
| 8,656,215 | B2* | 2/2014 | Akirav | G06F 11/2028 707/655 |
| 9,037,822 | B1 | 5/2015 | Meiri et al. | |
| 9,189,341 | B1 | 11/2015 | Natanzon et al. | |
| 2010/0115332 | A1* | 5/2010 | Zheng | G06F 11/1466 714/6.2 |
| 2012/0047392 | A1* | 2/2012 | Akirav | G06F 11/2094 714/3 |

* cited by examiner

*Primary Examiner* — Sarai E Butler
(74) *Attorney, Agent, or Firm* — Stephen R. Tkacs; Stephen J. Walder, Jr.; Robert M. Sullivan

(57) ABSTRACT

A mechanism is provided in a data processing system comprising at least one processor and at least one memory, the at least one memory comprising instructions which are executed by the at least one processor and configure the processor to implement a replication environment. A first replication process executing in the replication environment replicates a first consistency group of production volumes to a first set of disaster recovery (DR) volumes. The first consistency group comprises a shared volume that belongs to a second consistency group and wherein a second replication process replicates the shared volume to a second set of DR volumes. Responsive the first consistency group being current and replication stopping for the first consistency group, the first replication process generates a consistent image for each DR volume within the first set of DR volumes to form a first set of consistent images. Responsive to a disaster event, the mechanism enables access to the first set of consistent images for an application executing on a first production system associated with the first consistency group.

20 Claims, 7 Drawing Sheets

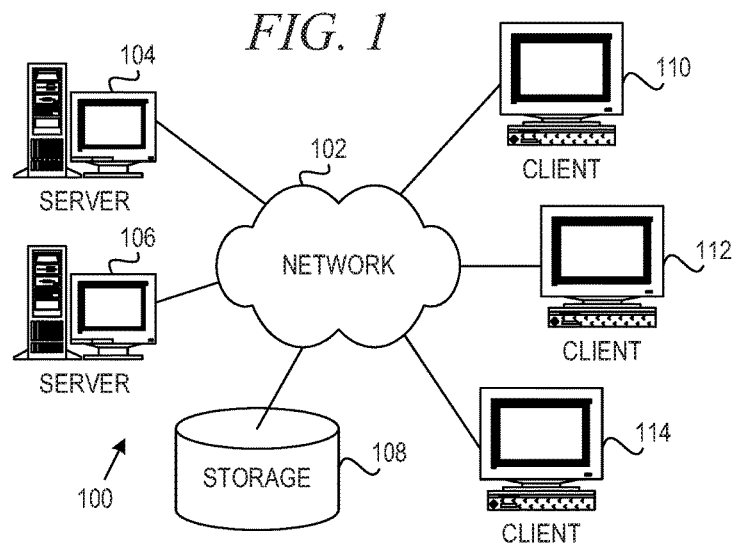
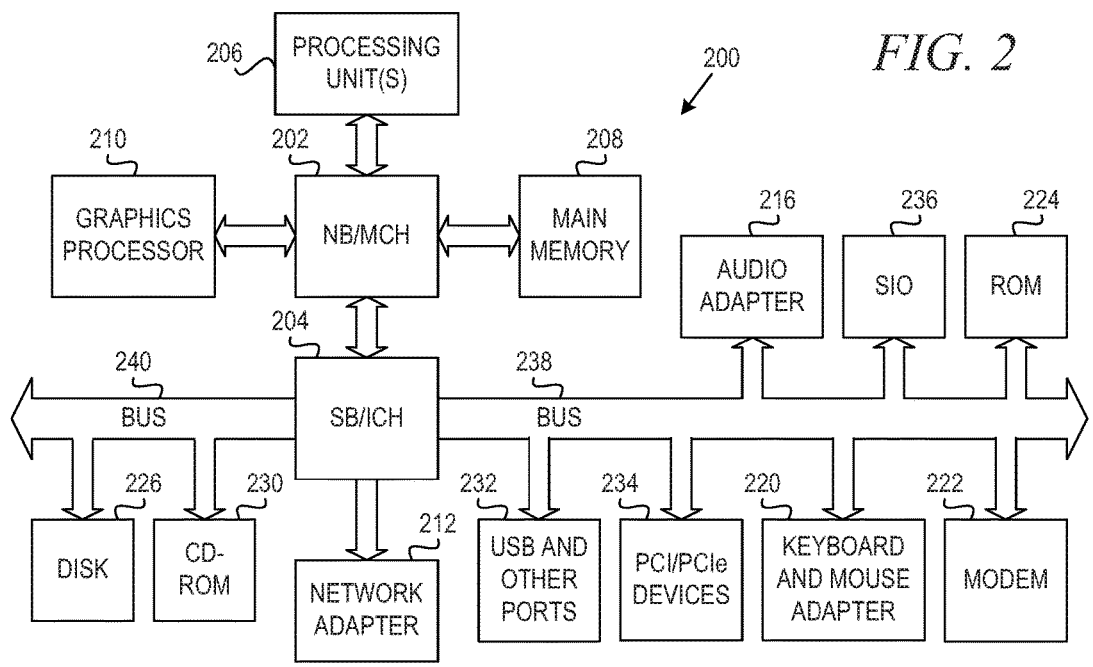

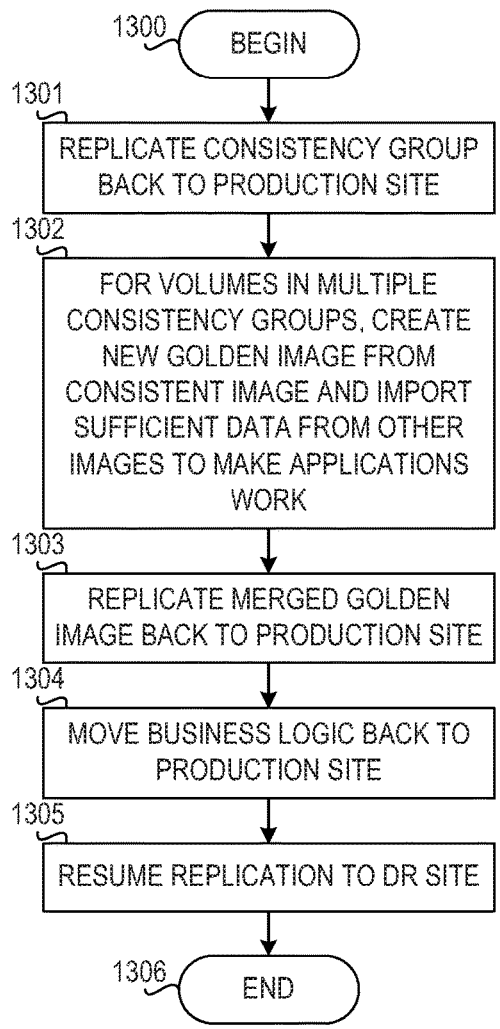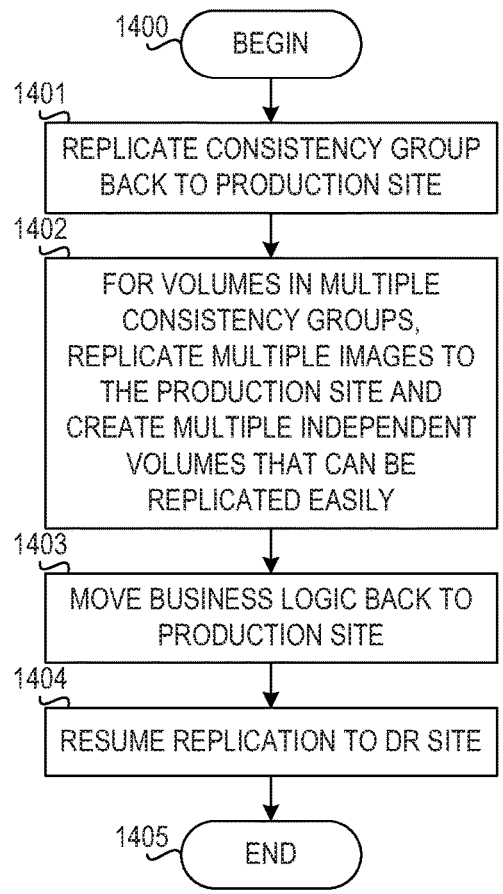

REPLICATION WITH MULTIPLE CONSISTENCY GROUPS PER VOLUME

BACKGROUND

The present application relates generally to an improved data processing apparatus and method and more specifically to mechanisms for replication with multiple consistency groups per volume.

Replication in computing involves sharing information so as to ensure consistency between redundant resources, such as software or hardware components, to improve reliability, fault-tolerance, or accessibility. Active (real-time) storage replication is usually implemented by distributing updates of a block device to several physical hard disks. This way, any file system supported by the operating system can be replicated without modification, as the file system code works on a level above the block device driver layer. It is implemented either in hardware (in a disk array controller) or in software (in a device driver).

The most basic method is disk mirroring, typical for locally connected disks. The storage industry narrows the definitions, so mirroring is a local (short-distance) operation. A replication is extendable across a computer network, so the disks can be located in physically distant locations, and the master-slave database replication model is usually applied. The purpose of replication is to prevent damage from failures or disasters that may occur in one location, or in case such events do occur, improve the ability to recover. For replication, latency is the key factor because it determines either how far apart the sites can be or the type of replication that can be employed.

The main characteristic of such cross-site replication is how write operations are handled:

Synchronous replication—guarantees "zero data loss" by the means of atomic write operation, i.e., write either completes on both sides or not at all. Write is not considered complete until acknowledgement by both local and remote storage.

Asynchronous replication—write is considered complete as soon as local storage acknowledges it. Remote storage is updated, but probably with a small lag. Performance is greatly increased, but in case of losing a local storage, the remote storage is not guaranteed to have the current copy of data and most recent data may be lost. The main difference between synchronous and asynchronous volume replication is that synchronous replication needs to wait for the destination server in any write operation.

Semi-synchronous replication—this usually means that a write is considered complete as soon as local storage acknowledges it and a remote server acknowledges that it has received the write either into memory or to a dedicated log file. The actual remote write is not performed immediately but is performed asynchronously, resulting in better performance than synchronous replication but offering no guarantee of durability.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided in a data processing system comprising at least one processor and at least one memory, the at least one memory comprising instructions which are executed by the at least one processor and configure the processor to implement a replication environment which operates to perform the method. The method comprises replicating, by a first replication process executing in the replication environment, a first consistency group of production volumes to a first set of disaster recovery (DR) volumes. The first consistency group comprises a shared volume that belongs to a second consistency group and wherein a second replication process replicates the shared volume to a second set of DR volumes. The method further comprises responsive the first consistency group being current and replication stopping for the first consistency group, generating, by the first replication process, a consistent image for each DR volume within the first set of DR volumes to form a first set of consistent images. The method further comprises enabling access to the first set of consistent images for an application executing on a first production system associated with the first consistency group responsive to a disaster event.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 1 is an example diagram of a distributed data processing system in which aspects of the illustrative embodiments may be implemented;

FIG. 2 is an example block diagram of a computing device in which aspects of the illustrative embodiments may be implemented;

FIG. 13 is a flowchart illustrating operation of a mechanism for enabling access to an image having multiple DR images during a disaster in accordance with an illustrative embodiment; and FIG. 14 is a flowchart illustrating operation of a mechanism for enabling access to multiple independent images during a disaster in accordance with an illustrative embodiment.

DETAILED DESCRIPTION

Figure 3:
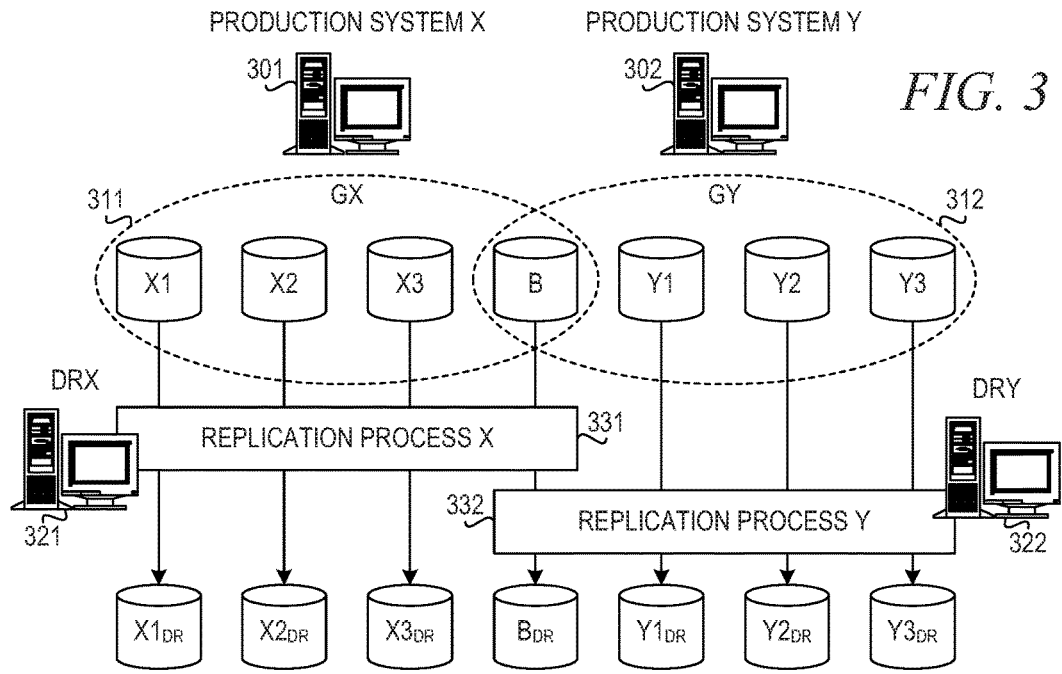
FIG. 3 is a block diagram illustrating a mechanism for replication with multiple consistency groups per volume in accordance with an illustrative embodiment.

In block-based storage systems, replication to remote storage systems is a commonly available feature. In some products, it is possible to link multiple volumes to be replicated together into a consistency group. The goal of linking these volumes is to ensure that the data across these volumes are maintained from a single point in time, making them mutually consistent and usable for disaster recovery (DR). This typically involves stopping replication for every volume within this consistency group if any one volume within the group is unable to replicate. In existing systems, a volume may only be a member of a single consistency group. A consistency group typically includes all volumes that make a single application that must be recovered as a unit.

However, a volume may be a vital part of multiple applications. The illustrative embodiments provide mechanisms for replication with multiple consistency groups per volume. The illustrative embodiments allow a volume to belong to any number of replicating consistency groups. If any consistency group is manually or automatically stopped, a point-in-time copy of any shared volumes is captured, preserving the data at the same point in time as the other volumes in that consistency group. This makes multiple group membership simple to configure and use with minimal additional storage space or bandwidth requirements. Each consistency group retains all functionality that it would have without volumes being shared between multiple groups.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As shown in FIG. 1, one or more of the computing devices, e.g., server 104, may be specifically configured to implement a mechanism for replication with multiple consistency groups per volume. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates replication with multiple consistency groups per volume.

As noted above, the mechanisms of the illustrative embodiments utilize specifically configured computing devices, or data processing systems, to perform the operations for replication with multiple consistency groups per volume. These computing devices, or data processing systems, may comprise various hardware elements which are specifically configured, either through hardware configuration, software configuration, or a combination of hardware and software configuration, to implement one or more of the systems/subsystems described herein. FIG. 2 is a block diagram of just one example data processing system in which aspects of the illustrative embodiments may be implemented. Data processing system 200 is an example of a computer, such as server 104 in FIG. 1, in which computer usable code or instructions implementing the processes and aspects of the illustrative embodiments of the present invention may be located and/or executed so as to achieve the operation, output, and external affects of the illustrative embodiments as described herein.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System p® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described hereafter with regard to the mechanism for replication with multiple consistency groups per volume.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

FIG. 3 is a block diagram illustrating a mechanism for replication with multiple consistency groups per volume in accordance with an illustrative embodiment. Consider a server with a boot volume B, with one application using volumes X1, X2, and X3, and a second application using volumes Y1, Y2, and Y3. The server may include production system X 301 and production system Y 302. In an alternate embodiment, the server may be a single production system.

The server may have a consistency group GX 311 containing volumes X1, X2, and X3 and consistency group GY 312 containing volumes Y1, Y2, and Y3. This would maintain the three volumes in each application at the same point in time. However, if the state of the boot volume was essential to recovering each application, volume B would ideally be in each consistency group, thus having X1, X2, X3, and B in group GX 311 and Y1, Y2, Y3, and B in GY 312.

In prior art systems, this is not a feature; therefore, a user would have to place volumes B, X1, X2, X3, Y1, Y2, and Y3 within a single consistency group. This is far from ideal, because a failure to replicate any of those seven volumes would stop replication for all of the volumes. The risk of replication stopping for an application has increased significantly, even though the set of volumes directly depended on by the application is still small. As the number of applications sharing a common volume increases, and the number of applications having to share a consistency group increases, the number of applications having their DR impacted by a single volume failing to replicate increases. Therefore, the solution of the prior art does not scale well.

In accordance with the illustrative embodiment, consistency group GX 311 includes volumes X1, X2, X3, and B, and consistency group GY 312 includes volumes Y1, Y2, Y3, and B, with volume B existing in both consistency groups. Volumes B, X1, X2, X3, Y1, Y2, and Y3 are production volumes. A production volume is a volume containing data that is read and written by a production host system, i.e., one performing business logic. A productions system, such as production system X 301 or production system Y 302, is a storage system containing production volumes.

A DR volume is a volume containing a continually updating remote replica of data, replicating from a production volume for use in disaster recovery. A DR system is a storage system containing DR volumes. In one embodiment, a DR system is at a large distance (e.g., 100 m to 20,000 km) from the production system. A system may be a DR system for some volumes while being a production system for other volumes.

Replication process X 331 replicates volumes X1, X2, X3, and B to DR system X 321 to form DR volumes $X1_{DR}$, $X2_{DR}$, $X3_{DR}$, and $B_{DR}$. Replication process Y 332 replicates volumes Y1, Y2, Y3, and B to DR system Y 322 to form DR volumes $Y1_{DR}$, $Y2_{DR}$, $Y3_{DR}$, and $B_{DR}$. As shown in FIG. 3, volume B exists in both consistency groups GX 311 and GY 312, and volume B is replicated by both replication process X 331 and replication process Y 332.

Production systems 301, 302 have objects describing each production volume. Each production volume object is able to store a list of consistency groups of which the volume is a part. This list may have any number of consistency groups associated with the volume. A consistency group can appear on the list of any number of volumes.

Depending on the implementation, a volume may be part of no consistency groups, which would mean that it would replicate without regard to any other volume in the system. This is equivalent to the volume being part of a single consistency group no other volume is a part of. To simplify the description, each volume being replicated will be part of at least one consistency group, and a consistency group will be the only object for which replication can be started or stopped. In practice, a system would probably limit the maximum number of consistency groups that a volume is a part of, to limit configuration complexity and memory usage. The illustrative embodiments do not require or benefit from any limit here. Likewise, the number of volumes in a consistency group may be limited for system-specific reasons, such as performance or complexity requirements.

These objects are shared with the DR system 321, 322, which thus also knows which volumes belong to which consistency groups. Each DR volume additionally has a consistency state, which is one of the following values: inconsistent, current, and historical. Consistency groups also each have one of the same three states.

Initially, all DR volumes have a state of "inconsistent," and all consistency groups are stopped. Each consistency group may be started or stopped, and each volume will be replicated as long as at least one consistency group to which the volume belongs is started. The consistency groups to which a volume belongs may be at different points in time, because the groups are not up to date and stopped at different times. In that case, a separate point-in-time copy would be maintained for each out-of-date consistency group to preserve consistency with the rest of the group.

When a consistency group is started or stopped, for each DR volume within that group, a different action is taken depending on the consistency state. Starting and stopping may be done by the user or automatically: stopping for replication errors and restarting as part of error recovery.

Figure 4:
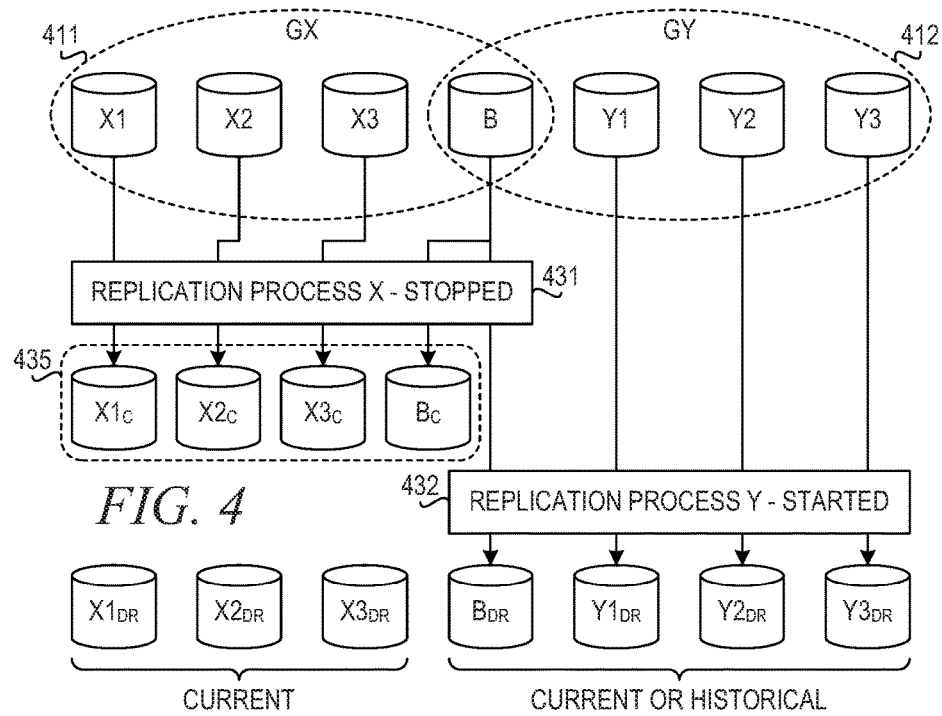
FIG. 4 is a block diagram illustrating a mechanism for replication using consistent images in accordance with an illustrative embodiment.

FIG. 4 is a block diagram illustrating a mechanism for replication using consistent images in accordance with an illustrative embodiment. In the depicted example, consistency group GX 411 has been replicated to form DR volumes $X1_{DR}$, $X2_{DR}$, $X3_{DR}$, and $B_{DR}$. Consistency group GY 412 has been replicated to form DR volumes $Y1_{DR}$, $Y2_{DR}$, $Y3_{DR}$, and $B_{DR}$. Volume B has been replicated to form DR volume $B_{DR}$ by both replication process X 431 and replication process Y 432.

Consistent images are generated for each DR volume whenever a "current" consistency group is stopped. A consistent image is a point-in-time copy, or snapshot, of the volume at the point when a "current" consistency group stops replication. One means of doing this may be to use a copy-on-write technology, such as FlashCopy® in IBM Spectrum Virtualize™, which can store the changes on a thin-provisioned volume with minimal storage space and bandwidth overhead. Any means of preserving the data at a fixed point in time is appropriate.

As shown in FIG. 4, replication process X 431 stops while replication process Y 432 is started. DR volumes $X1_{DR}$, $X2_{DR}$, $X3_{DR}$ are in the "current" state. Replication process X 431 preserves the data to maintain consistency for consistency group GX, thus forming consistent images 435, including $X1_C$, $X2_C$, $X3_C$, and $B_C$. DR volumes $Y1_{DR}$, $Y2_{DR}$, $Y3_{DR}$, and $B_{DR}$, still being replicated by replication process Y 432 may be in the "current" state or the "historical" state.

It is important that the consistent images 435 are captured for all DR volumes in the group at the exact point in time that replication process X 431 stopped to ensure consistency across all volumes in consistency group GX 411. The replication environment will determine the best means to do this. One solution may be to briefly pause replication for all volumes in the consistency group 411 at the point the consistent images 435 need to be taken, generating consistent static data across all volumes that can be captured on each volume in turn, before resuming replication on all volumes.

This point-in-time copy is accessed in lieu of the DR volume for hosts that want to access data for the application contained in consistency group 411, including for disaster recovery. Depending on the point-in-time copy technology, the consistent images might be only readable, or both readable and writable. If they are only readable, additional actions to the point-in-time copies may be required to make them writable, for example restoring them to writable volumes. If the point-in-time technology supports writing to snapshots, the consistent images may be used directly in disaster recovery.

The consistent images 435 preserve a historical set of data for a consistency group for as long as it is required. The consistent images 435 are dropped when the consistency group transitions back from "historical" to "current," i.e., replication of the consistency group has been started and all DR volumes have resynchronized. Dropping a consistent image is different depending on the point-in-time technology used and the resource used. With IBM FlashCopy®, the mapping would be stopped and the target volume optionally deleted.

It may be observed that this use of consistent images preserves DR capability while resynchronizing, as consistent images 435 are retained across the consistency group until every volume is "current."

For a DR volume in the "inconsistent" state, on starting replication, there is no valid data on the DR volume in this state. This DR volume will synchronize as normal, unless the DR volume is already synchronizing as part of another consistency group. When synchronization completes, the DR volume's consistency state will become "current." When all volumes in a group become "current," the whole group will be considered in the "current" state as will be described below.

On stopping replication of a consistency group, there is no valid data on any DR volume in the "inconsistent" state. Replication can be stopped for such volumes without any impact for this consistency group. Replication will only actually be stopped for the volume if it has been stopped for every consistency group to which the volume belongs.

For a DR volume in the "current" state, on starting replication of a consistency group containing the volume, there is already an up-to-date copy for this volume. No resynchronization will be needed. The consistent image for this volume for this group, if there is one, will be retained until all the volumes in this group have resynchronized. Then, the consistent image will be dropped. Any consistent images for this volume for other groups will be unaffected.

On stopping replication, the data on the DR volume in the "current" state is up-to-date. If the consistency group is "current" (i.e., all DR volumes in the group are "current"), the replication environment preserves that data to maintain consistency for this consistency group. A consistent image is generated for this consistency group, as described above. If there are no other running consistency groups to which this DR volume belongs, the consistency state goes to "historical" and replication stops for that volume. Otherwise, replication continues for that volume, and the consistency state remains "current" in order to provide up-to-data data for the still-running consistency groups. If the consistency group is "historical" or "inconsistent" (i.e., not all DR volumes in the group are "current"), the replication environment need not preserve the data, so no consistent image is created with the stopping of this consistency group.

For a DR volume in the "historical" state, on starting replication, there is only historical data on the DR volume. This volume will resynchronize, leaving all consistent images for this volume in place. When synchronization completes, the consistent image for this volume for this group, if there is one, will be dropped, and the volume's consistency state will become "current." If the volume is already resynchronizing for another consistency group, that synchronization effort will also be used for this group. The volume will be synchronized for both consistency groups, and when complete, both consistency groups will consider the volume synchronized. Note that the volume will resynchronize from its latest state, which may be later than the consistent image for this consistency group. This lowers the time of synchronization.

If replication stops with a DR volume in the "historical" state, the replication environment must still be attempting to resynchronize this DR volume from the last time. Replication is stopped for this volume for this consistency group, and the consistency state remains "historical." Replication will only actually be stopped for the volume if it has been stopped for every consistency group to which it belongs.

The state of a consistency group will depend on the states of the DR volumes within it. The actions available for a consistency group will depend on its state. If any volume in a consistency group is "inconsistent," then the consistency group is "inconsistent." Upon starting replication, the DR volumes in the consistency group cannot be used for disaster recovery. Replication of the group can be stopped.

When the replication of the consistency group is stopped, the group is "inconsistent." The group cannot be used for disaster recovery. Replication of the group can be started.

If all volumes in a consistency group are "current," then the group is "current." Upon starting replication, there is already an up-to-date copy or every volume in this consistency group, so the group is up-to-date. The DR volumes in the consistency group can be used for disaster recovery, and replication can be stopped.

When replication for the consistency group is stopped, the group is "historical." There may be an up-to-date copy for some or all volumes in this consistency group, for which resynchronization would be a zero-cost action (such volumes can immediately use the up-to-date copy for this consistency group). The DR volumes in the consistency group can be used for disaster recovery, and replication of the group can be started.

If no volumes in a consistency group are "inconsistent" and any volumes in that consistency group are "historical," the group is "historical." Upon starting replication, there is only historical data on at least one DR volume in this group. The synchronization process will attempt to make all such DR volumes "current." There is guaranteed to be historical data from the same point in time for every volume in this consistency group, so disaster recovery is available for this consistency group. Replication for this group can be stopped.

When replication for the consistency group is stopped, the group is "historical." There is guaranteed to be historical data from the same point in time for every volume in the consistency group, so disaster recovery is available for this consistency group. The "historical" DR volumes may be resynchronized if they are part of any started consistency groups, but that will not affect this consistency group. Replication for the consistency group can be started.

In a disaster, read/write access is required for any application being recovered. Replication must be stopped as part of this process. Therefore, to enable access to the DR volumes during a disaster, first replication must be stopped for the consistency group if it is running. This may be performed as described above, and may include creating consistent images if the consistency group has a state of "current." With the consistency group now stopped, and a consistent image created for each DR volume, read and write access to the consistent images is offered to host systems.

Figure 5:
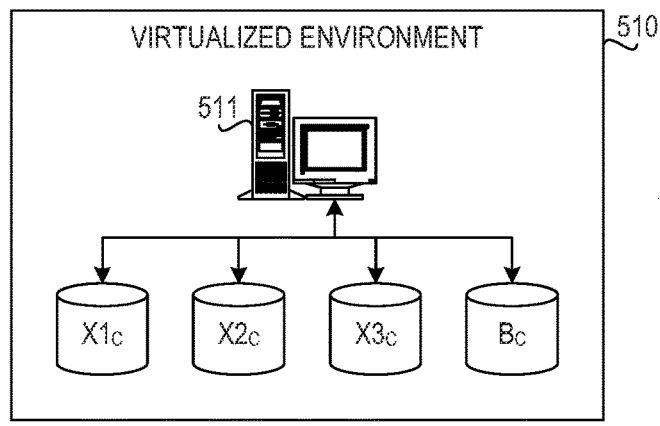
FIG. 5 is a block diagram illustrating a mechanism for enabling access in a disaster in accordance with an illustrative embodiment.

FIG. 5 is a block diagram illustrating a mechanism for enabling access in a disaster in accordance with an illustrative embodiment. Volumes in multiple consistency groups may offer accessible images from multiple points in time. A single host system should not be offered access to multiple consistent images of the same volume. To address this, the mechanism of the illustrative embodiment temporarily creates another instance 511 of the host system in a virtualized environment 510, such as VMware®, to separate the two instances of a shared volume. A host system that can see a volume shared between multiple consistency groups should only be able to see members of the consistency group containing the visible consistent image of the volume and not members of any other consistency group containing that volume. This ensures that the instance of the host system 511 sees a consistent set of volumes. Thus, as shown in FIG. 5, virtualized environment 510 includes the instance 511 of the host system and consistent images $X1_C$, $X2_C$, $X3_C$, and $B_C$ for consistency group X.

Once the disaster is over, there are multiple scenarios. In a first scenario, changes to the DR volumes are discarded, and the consistency group reverts to the data on the original production volumes. This is achieved by restarting replication as above, including discarding the consistent images when the group is "current" again.

In another scenario, changes to the DR volumes are retained, and the consistency group is replicated back to the production site. A volume in a single consistency group may be replicated back to the production site without any complications. Any volume in multiple consistency groups may have multiple DR images, which must be handled to merge content before replicating back to the production site.

Figure 6:
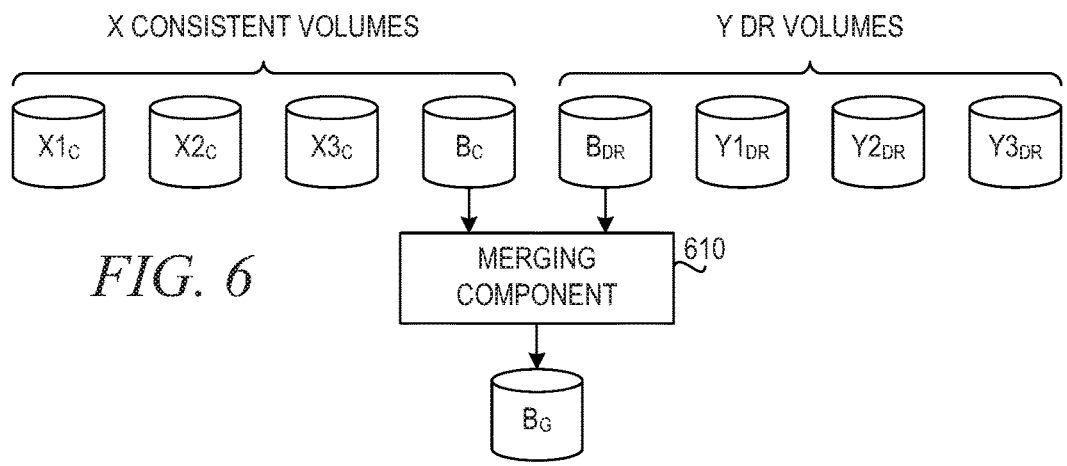
FIG. 6 is a block diagram illustrating a mechanism for externally merging multiple consistent images to the production system in accordance with an illustrative embodiment.

FIG. 6 is a block diagram illustrating a mechanism for externally merging multiple consistent images to the production system in accordance with an illustrative embodiment. Merging component 610 merges the multiple images to the replication system. For example, merging component 610 may merge consistency group X consistent volumes $X1_C$, $X2_C$, $X3_C$, and $B_C$ with consistency group Y DR volumes $Y1_{DR}$, $Y2_{DR}$, $Y3_{DR}$, and $B_{DR}$. In accordance with the illustrative embodiment merging component 610 creates a new "golden" image $B_G$ from one consistent image $B_C$ and importing sufficient data from the other image $B_{DR}$ to make the other applications work. A host would need to be able to access the consistency groups sharing a single volume for this purpose. This merge task would not impact any applications running on the DR site, and the merge task could be tested fully before being used. Finally, this golden image BG is replicated back to the production site so business logic could continue there, and replication is resumed to the DR site.

Alternatively, the multiple images may be maintained in separate images, creating multiple fully independent volumes that can be replicated individually. Business logic would be moved to the volumes on the production site, and replication would be resumed to the DR site.

The illustrative embodiments ensure that DR capabilities are rapidly available, and thanks to the multiple consistency groups, each application is more likely to be more up-to-date. There is a time cost to retaining the DR copy, handling the increased number of images that need to be replicated back to the production system, but this cost is deferred to after the disaster recovery has been successfully achieved. The bandwidth consumed is the same as if the volumes were only part of a single consistency group.

The above embodiments assume that a current volume will have the same point in time for all consistency groups to which the volume belongs. This is true for synchronous replication and can be true for some kinds of asynchronous replication. For an asynchronous replication solution that generates or applies consistent parcels of data on a group-by-group basis, it will be necessary to maintain data for a volume shared between consistency groups independently for each group.

The asynchronous replication solution may be such that consistency groups are updated atomically in large (>1 second) jumps. In this case, the production storage system must capture data for the volume at the points in time demanded for each consistency group to which the volume belongs. A consistent image appropriate to this point in time must be generated and preserved on the DR system for each consistency group. This image can be generated using a point-in-time copy technology or similar. If that consistency group must stop, that consistent image is retained to preserve the consistency of the consistency group. The consistent image is dropped when the consistency group is started and has a new complete set of data across all volumes. If the asynchronous solution has continually updating DR volumes, it will be harder to make a volume dynamically consistent with multiple separate consistency groups.

Figure 7:
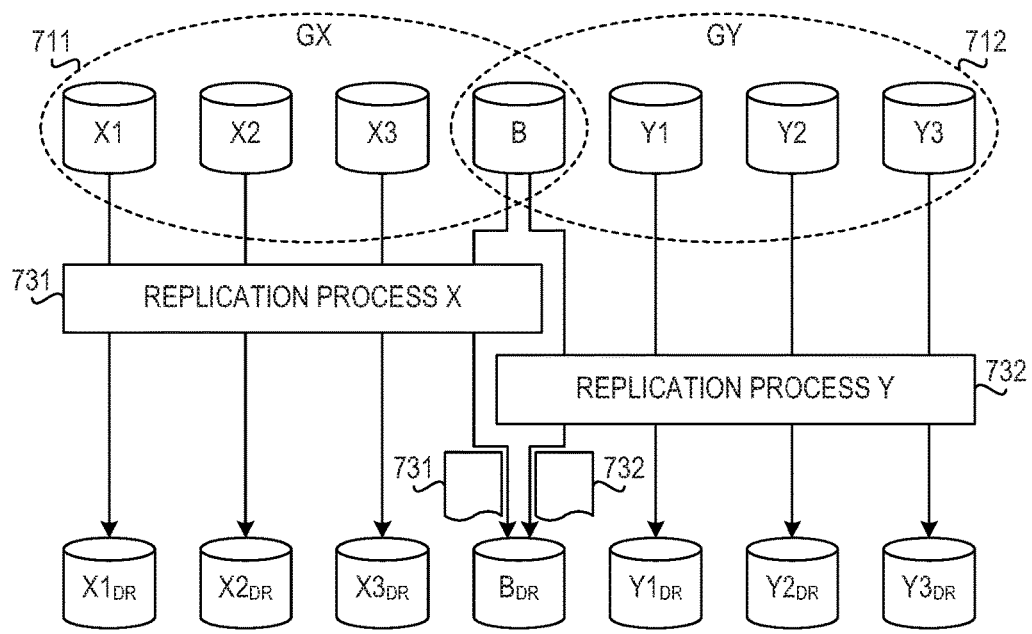
FIG. 7 is a block diagram illustrating a mechanism for generating consistent images using metadata sent with write data in accordance with an illustrative embodiment.

FIG. 7 is a block diagram illustrating a mechanism for generating consistent images using metadata sent with write data in accordance with an illustrative embodiment. Replication process X 731 replicates consistency group GX 711, and replication process Y 732 replicates consistency group GY 712. Production volume B belongs to both consistency group GX 711 and GY 712, and both replication process X 731 and replication process Y 732 replicate volume B to DR volume $B_{DR}$. In accordance with the illustrative embodiment, metadata 731, 732 are sent with write data for volumes shared between multiple consistency groups to describe how that write data should be applied with respect to each consistency group, allowing a consistent image to be generated for any consistency group to which it belongs. Thus, for example, metadata 731 describe how write data from consistency group GX 711 should be applied with respect to group GX 711, and metadata 732 describe how write data from consistency group GY 712 should be applied with respect to group GY 712.

Figure 8:
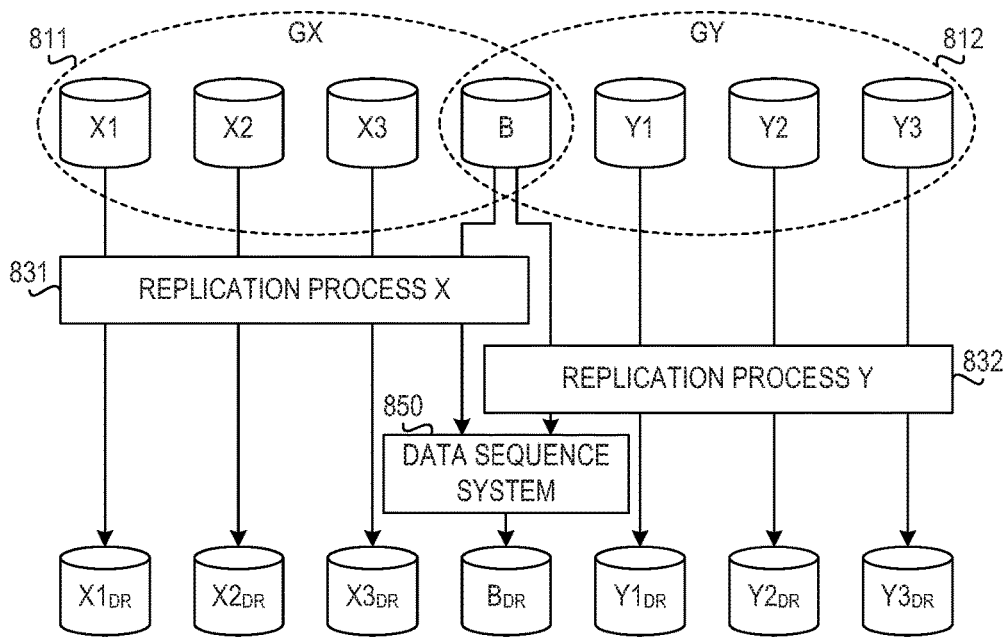
FIG. 8 is a block diagram illustrating a mechanism for generating consistent images using a common asynchronous data sequencing system in accordance with an illustrative embodiment.

FIG. 8 is a block diagram illustrating a mechanism for generating consistent images using a common asynchronous data sequencing system in accordance with an illustrative embodiment. Multiple consistency groups that share a volume could be constrained to a common asynchronous data sequence system, such that writes are applied in sequence across all the groups. Replication process X 831 replicates consistency group GX 811, and replication process Y 832 replicates consistency group GY 812. Production volume B belongs to both consistency group GX 811 and GY 812, and both replication process X 831 and replication process Y 832 replicate volume B to DR volume $B_{DR}$. In accordance with the illustrative embodiment, data sequence system 850 receives writes from replication process X 831 and from replication process Y 832 and applies all writes in sequence across groups GX 811 and GY 812. The shared volume, $B_{DR}$, can immediately be used for a consistent image for any consistency group to which the shared volume belongs.

Alternatively, the volume could be replicated separately for each consistency group, although this increases replication bandwidth requirements.

If a volume is in multiple consistency groups, it will be desirable to offer actions on all consistency groups together. This could allow sharing of consistent images between multiple consistency groups. In turn, this would allow all applications sharing the volume to be mounted together for disaster recovery and would avoid multiple modified images of the shared volume being created. This would significantly simplify failing back to the production system after a disaster. Therefore, the illustrative embodiments provide commands to start, stop, and enable access (for disaster recovery) to the set of consistency groups that share any volumes. These commands would maintain a common point in time for all of the consistency groups and all of the applications contained within. The user may be allowed to choose whether replication failures stop this superset of consistency groups or only the immediate consistency group. This would allow the user to dynamically prioritize stopping a small set of volumes, keeping the latest data for as many applications as possible, or stopping all interconnected volumes and consistency groups to simplify the post-DR process.

As a further extension, it would be possible to simultaneously give the effect of stopping just the directly affected consistency group on a replication failure while also giving the effect of stopping all interconnected consistency groups. If the system dynamically maintained an additional consistency group out of each interconnected set of user-created consistency groups, a replication failure on any volume would automatically capture a consistent image for the dynamically maintained large consistency group. The user could then choose whether to attempt disaster recovery on the large consistency group or on a smaller user-created group that might be more up-to-date.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 9:
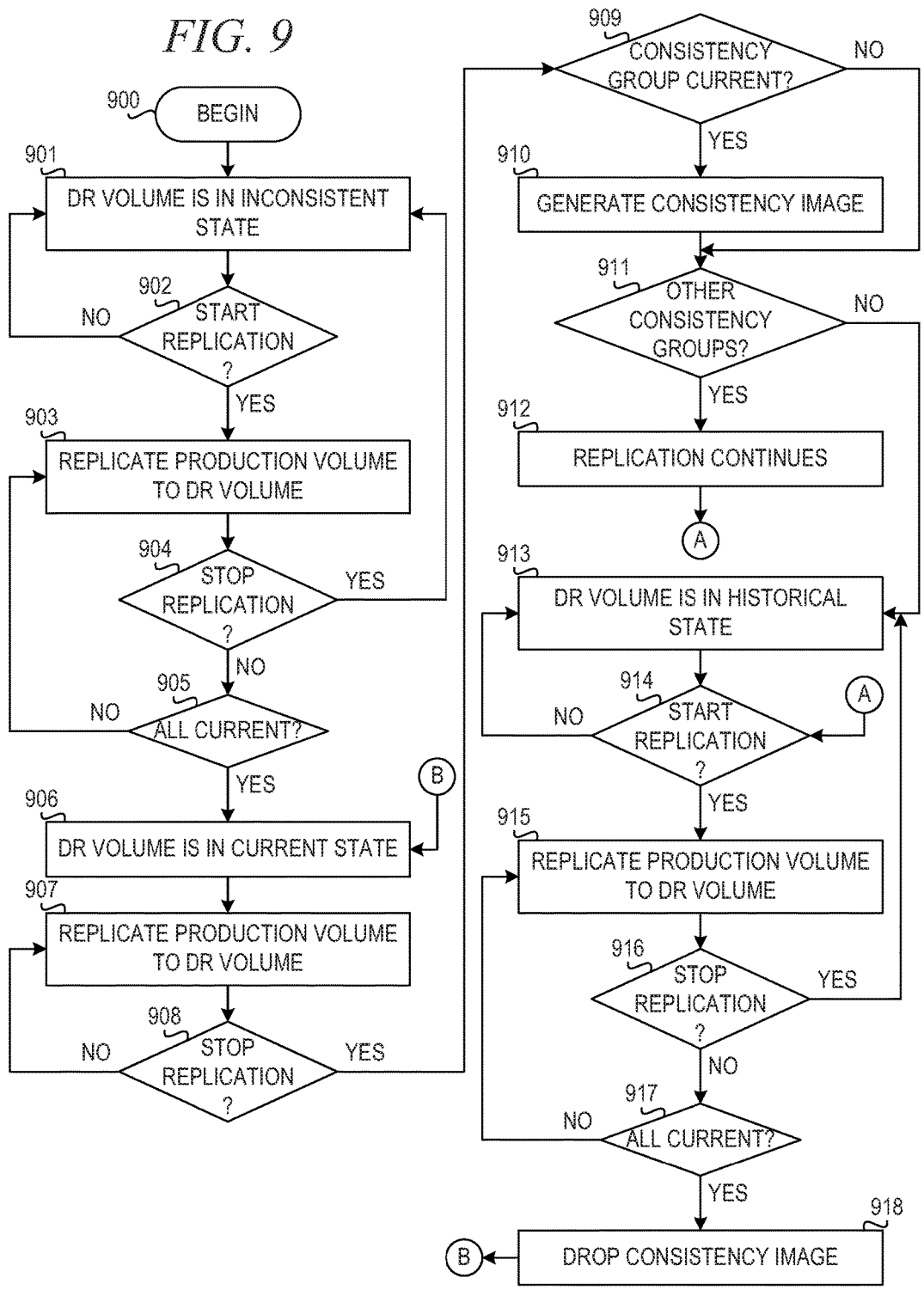
FIG. 9 is a flowchart illustrating operation of a mechanism for starting and stopping consistency groups in accordance with an illustrative embodiment.

FIG. 9 is a flowchart illustrating operation of a mechanism for starting and stopping consistency groups in accordance with an illustrative embodiment. Operation begins (block 900), and the disaster recovery (DR) volume is in an "inconsistent" state (block 901). The mechanism determines whether replication is started (block 902). If replication is not started, then operation returns to block 901 where the DR volume is in the inconsistent state.

If replication is started in block 902, then the mechanism replicates the production volume to the DR volume (block 903). Then, the mechanism determines whether replication is stopped (block 904). If replication is stopped in block 904, then operation returns to block 901 where the DR volume is in the inconsistent state. If replication is not stopped in block 904, then the mechanism determines whether the DR volume is up-to-date (block 905). If the DR volume is not up-to-date, then operation returns to block 903, and operation repeats until the DR volume is up-to-date.

If the DR volume is up-to-date in block 905, then the DR volume is in a "current" state (block 906). The mechanism replicates the production volume to the DR volume (block 907). The mechanism determines whether replication stops (block 908). If replication does not stop, then operation returns to block 907 to continue replication.

If replication is stopped in block 908, then the mechanism determines whether the consistency group is current (block 909). If the consistency group is current, then the mechanism generates a consistent image for the DR volume (block 910). Thereafter, or if the consistency group is not current in block 909, the mechanism determines whether the volume belongs to other consistency groups (block 911). If the volume does belong to other consistency groups, then replication continues (block 912), and operation proceeds to block 914. If the volume does not belong to other consistency groups in block 911, then the DR volume is in the "historical" state (block 913), and operation proceeds to block 914.

In block 914, the mechanism determines whether replication is started. If replication is not started, then operation returns to block 913. If replication is started in block 914, then the mechanism replicates the production volume to the DR volume (block 915). Then, the mechanism determines whether replication is stopped (block 916). If replication is stopped, then operation returns to block 913, and the DR volume is in the historical state. If replication is not stopped in block 916, then the mechanism determines whether the DR volume is up-to-date (block 917). If the DR volume is not up-to-date, then operation returns to block 915 to continue replication of the production volume to the DR volume. If the DR volume is up-to-date in block 917, then the mechanism drops the consistent image, if there is one (block 918), and operation returns to block 906, where the DR volume is in the current state.

Figure 10:
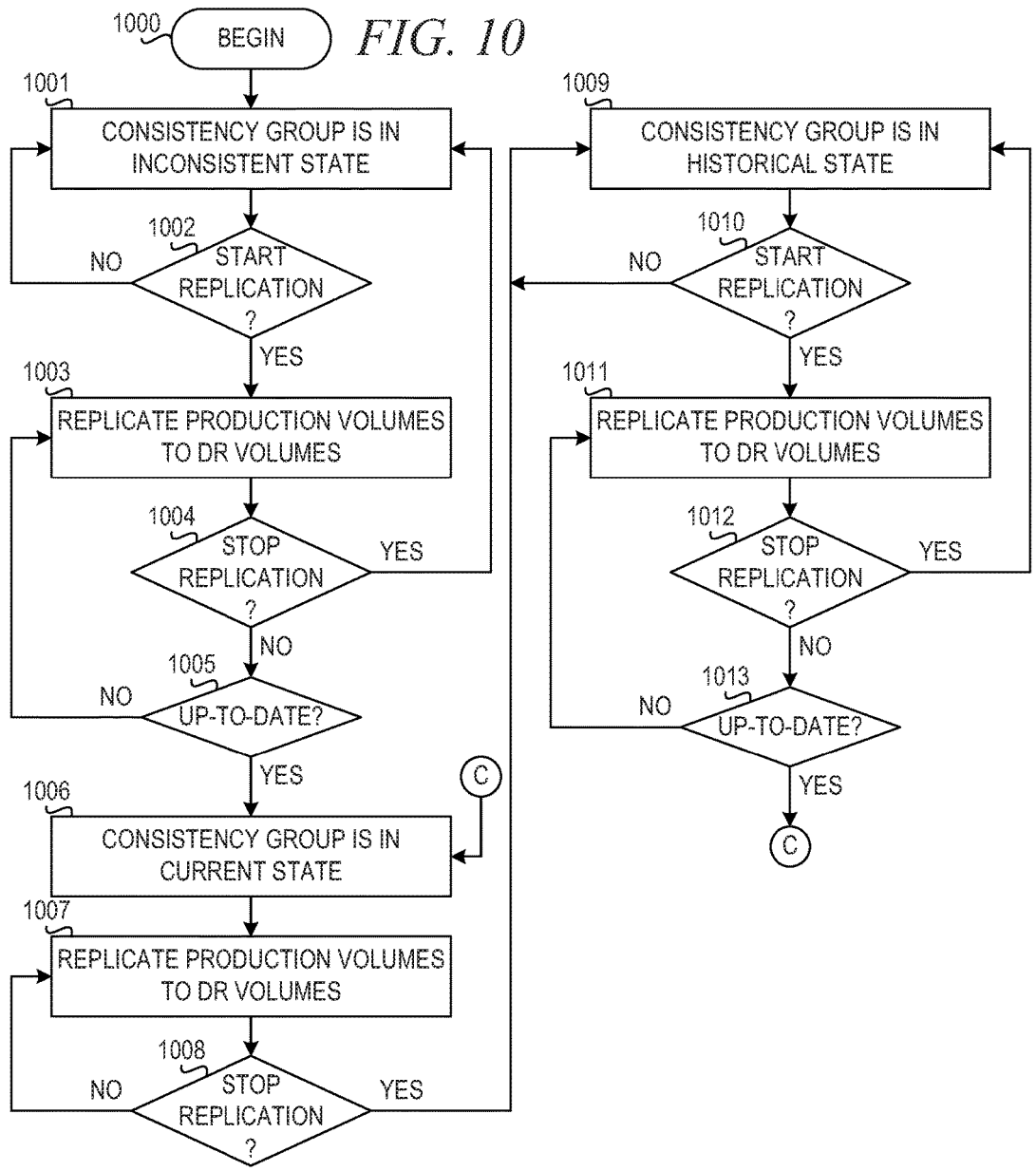
FIG. 10 is a flowchart illustrating operation of a mechanism for performing actions on a consistency group based on its state in accordance with an illustrative embodiment.

FIG. 10 is a flowchart illustrating operation of a mechanism for performing actions on a consistency group based on its state in accordance with an illustrative embodiment. Operation begins (block 1000), and the consistency group is in the "inconsistent" state (block 1001). The mechanism determines whether replication starts (block 1002). If replication does not start, operation returns to block 1001.

If replication starts in block 1002, then the mechanism replicates the production volumes to the DR volumes (block 1003). The mechanism then determines whether replication stops (block 1004). If replication stops, then operation returns to block 1001, and the consistency group is in the inconsistent state. If replication is not stopped in block 1004, then the mechanism determines whether all DR volumes in the consistency group are in the "current" state (block 1005). If all DR volumes are not current, then operation returns to block 1003 to continue replicating the production volumes to the DR volumes.

If all DR volumes are current in block 1005, then the consistency group is in the "current" state (block 1006). The mechanism replicates the production volumes to the DR volumes (block 1007). Then, the mechanism determines whether replication is stopped (block 1008). If replication is not stopped, then operation returns to block 1007. If replication is stopped in block 1008, then the consistency group is in the "historical" state (block 1009).

The mechanism determines whether replication is started (block 1010). If replication is not started, then operation returns to block 1009. If replication is started in block 1010, then the mechanism replicates the production volumes to the DR volumes (block 1011). The mechanism determines whether replication is stopped (block 1012). If replication is stopped, then operation returns to block 1009, and the consistency group is in the "historical" state. If replication is not stopped in block 1012, then the mechanism determines whether all DR volumes in the consistency group are current (block 1013). If all DR volumes are not current (i.e., at least one DR volume is in the historical state), then operation returns to block 1011 to replicate the production volumes to the DR volumes. If all DR volumes are current in block 1013, then operation proceeds to block 1006, where the consistency group is in the "current" state.

Figure 11:
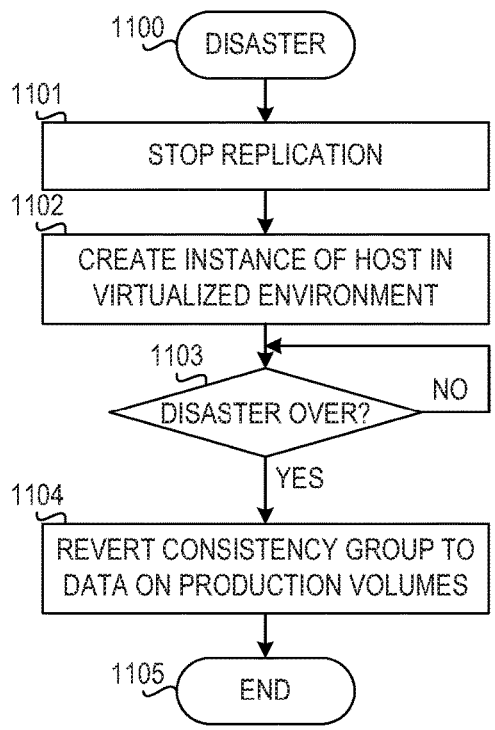
FIG. 11 is a flowchart illustrating operation of a mechanism for enabling access to consistent images during a disaster in accordance with an illustrative embodiment.

FIG. 11 is a flowchart illustrating operation of a mechanism for enabling access to consistent images during a disaster in accordance with an illustrative embodiment. Operation begins (block 1100), and the mechanism stops replication (block 1101). The mechanism creates an instance of the host in a virtualized environment to separate multiple instances of a shared volume (block 1102). The mechanism then determines whether the disaster is over (block 1103). If the disaster is not over, then operation returns to block 1103 until the disaster is over at which time the mechanism reverts the consistency group to data on the production volumes (block 1104). Thereafter, operation ends (block 1105).

Figure 12:
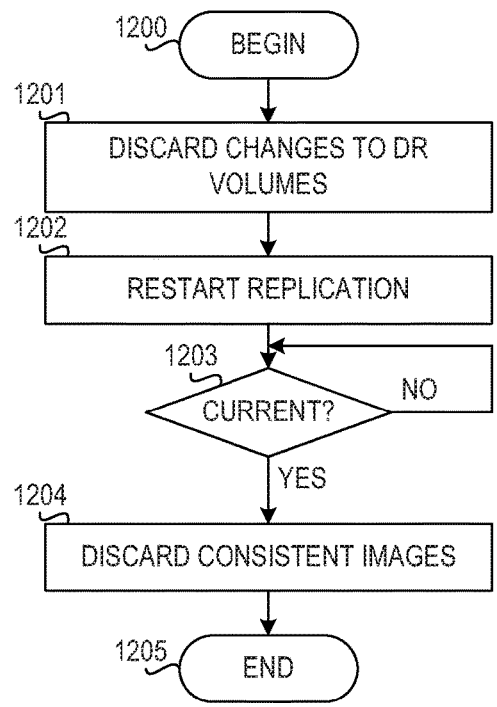
FIG. 12 is a flowchart illustrating operation of a mechanism for handling DR volume changes when disaster is over in accordance with an illustrative embodiment.

FIG. 12 is a flowchart illustrating operation of a mechanism for handling DR volume changes when disaster is over in accordance with an illustrative embodiment. Operation begins once the disaster is over (block 1200), and the mechanism discards changes to the DR volumes (block 1201). The mechanism restarts replication (block 1202). Then, the mechanism determines whether the consistency group is current (block 1203). If the consistency group is not current, then operation returns to block 1203 until the consistency group is current, at which time the mechanism discards the consistent images (block 1204). Thereafter, operation ends (block 1205).

FIG. 13 is a flowchart illustrating operation of a mechanism for enabling access to an image having multiple DR images during a disaster in accordance with an illustrative embodiment. Operation begins during a disaster (block 1300), and the mechanism replicates the consistency group back to the production site (block 1301). For volumes in multiple consistency groups, the mechanism creates a new "golden" image from consistent image and imports sufficient data from the other images to make the applications work (block 1302). The mechanism replicates the merged golden image back to the production site (block 1303) and moves the business logic back to the production (block 1304). The mechanism then resumes replication to the DR site (block 1305). Thereafter, operation ends (block 1306).

FIG. 14 is a flowchart illustrating operation of a mechanism for enabling access to multiple independent images during a disaster in accordance with an illustrative embodiment. Operation begins during a disaster (block 1400), and the mechanism replicates the consistency group back to the production site (block 1401). For volumes in multiple consistency groups, the mechanism replicates images to the production site and creates multiple independent volumes that can be replicated easily (block 1402). The mechanism moves the business logic back to the production (block 1403). The mechanism then resumes replication to the DR site (block 1404). Thereafter, operation ends (block 1405).

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising at least one processor and at least one memory, the at least one memory comprising instructions which are executed by the at least one processor and configure the processor to implement a replication environment which operates to perform the method, comprising:
   replicating, by a first replication process executing in the replication environment, a first consistency group of production volumes to a first set of disaster recovery (DR) volumes, wherein the first consistency group comprises a shared volume that belongs to a second consistency group and wherein a second replication process replicates the shared volume to a second set of DR volumes;
   responsive the first consistency group being current and replication stopping for the first consistency group, generating, by the first replication process, a consistent image for each DR volume within the first set of DR volumes to form a first set of consistent images; and
   responsive to a disaster event, enabling access to the first set of consistent images for an application executing on a first production system associated with the first consistency group.

2. The method of claim 1, wherein generating the first set of consistent images comprises performing a point-in-time copy of the first set of DR volumes.

3. The method of claim 2, wherein performing the point-in-time copy comprises using a copy-on-write technology to store changes on a thin-provisioned volume.

4. The method of claim 1, wherein enabling access to the first set of consistent images comprises:
   creating an instance of the first production system in a virtualized environment; and
   providing access to the first set of consistent images for the instance of the first production system in the virtualized environment.

5. The method of claim 1, further comprising:
   responsive to the disaster event ending, discarding changes to the first set of DR volumes.

6. The method of claim 5, wherein discarding changes to the first set of DR volumes comprises:
   restarting replication of the first consistency group of production volumes to the first set of DR volumes; and
   responsive to the first set of DR volumes being current, discarding the first set of consistent images.

7. The method of claim 1, further comprising:
   responsive to the disaster event ending, merging, by a merging component executing within the replication environment, a consistent image of the shared volume within the first set of consistent images and a DR volume of the shared volume within the second set of DR volumes to form a merged volume; and
   providing the merged volume to the first production system.

8. The method of claim 7, wherein merging the consistent image of the shared volume and the DR volume of the shared volume within the second set of DR volumes comprises:
   creating a new golden image from the consistent image of the shared volume; and
   importing data from the DR volume of the shared volume within the second set of DR volumes into the golden image.

9. The method of claim 1, further comprising:
   responsive to the disaster event ending, creating multiple fully independent volumes corresponding to the shared volume.

10. The method of claim 1, wherein the first replication process performs asynchronous replication, the method further comprising:
    sending, by the first replication process, metadata with write data for the shared volume, wherein the metadata describes how the write data is to be applied with respect to the first consistency group,
    wherein generating the consistent image for the shared volume comprises generating the consistent image based on the metadata.

11. The method of claim 1, wherein the first replication process performs asynchronous replication, the method further comprising:
    applying, by a sequence system executing within the replication environment, writes to a DR volume corresponding to the shared volume in sequence.

12. The method of claim 1, wherein the shared volume is a boot volume.

13. An apparatus comprising:
    at least one processor; and
    a memory coupled to the at least one processor, wherein the memory comprises instructions which, when executed by the at least one processor, cause the processor to implement a replication environment, wherein the instructions cause the at least one processor to:

replicate, by a first replication process executing in the replication environment, a first consistency group of production volumes to a first set of disaster recovery (DR) volumes, wherein the first consistency group comprises a shared volume that belongs to a second consistency group and wherein a second replication process replicates the shared volume to a second set of DR volumes;

responsive the first consistency group being current and replication stopping for the first consistency group, generate, by the first replication process, a consistent image for each DR volume within the first set of DR volumes to form a first set of consistent images; and responsive to a disaster event, enable access to the first set of consistent images for an application executing on a first production system associated with the first consistency group.

14. The apparatus of claim 13, wherein the instructions further cause the at least one processor to:

responsive to the disaster event ending, merge, by a merging component executing within the replication environment, a consistent image of the shared volume within the first set of consistent images and a DR volume of the shared volume within the second set of DR volumes to form a merged volume; and provide the merged volume to the first production system.

15. The apparatus of claim 13, wherein the first replication process performs asynchronous replication, wherein the instructions further cause the at least one processor to:

send, by the first replication process, metadata with write data for the shared volume, wherein the metadata describes how the write data is to be applied with respect to the first consistency group, wherein generating the consistent image for the shared volume comprises generating the consistent image based on the metadata.

16. The apparatus of claim 13, wherein the first replication process performs asynchronous replication, wherein the instructions further cause the at least one processor to:

apply, by a sequence system executing within the replication environment, writes to a DR volume corresponding to the shared volume in sequence.

17. A computer program product comprising a computer readable storage medium having a computer readable program stored therein, wherein the computer readable program, when executed on a computing device, causes the computing device to implement a replication environment, wherein the computer readable program causes the computing device to:

replicate, by a first replication process executing in the replication environment, a first consistency group of production volumes to a first set of disaster recovery (DR) volumes, wherein the first consistency group comprises a shared volume that belongs to a second consistency group and wherein a second replication process replicates the shared volume to a second set of DR volumes;

responsive the first consistency group being current and replication stopping for the first consistency group, generate, by the first replication process, a consistent image for each DR volume within the first set of DR volumes to form a first set of consistent images; and responsive to a disaster event, enable access to the first set of consistent images for an application executing on a first production system associated with the first consistency group.

18. The computer program product of claim 17, wherein the computer readable program further causes the computing device to:

responsive to the disaster event ending, merge, by a merging component executing within the replication environment, a consistent image of the shared volume within the first set of consistent images and a DR volume of the shared volume within the second set of DR volumes to form a merged volume; and provide the merged volume to the first production system.

19. The computer program product of claim 17, wherein the first replication process performs asynchronous replication, wherein the computer readable program further causes the computing device to:

send, by the first replication process, metadata with write data for the shared volume, wherein the metadata describes how the write data is to be applied with respect to the first consistency group, wherein generating the consistent image for the shared volume comprises generating the consistent image based on the metadata.

20. The computer program product of claim 17, wherein the first replication process performs asynchronous replication, wherein the computer readable program further causes the computing device to apply, by a sequence system executing within the replication environment, writes to a DR volume corresponding to the shared volume in sequence.

* * * * *